United States Patent [19]

Jacquemart

[11] 4,218,417
[45] Aug. 19, 1980

[54] METHOD AND A DEVICE FOR REPAIRING INSULATED CABLE WHICH HAS BEEN DAMAGED OR JOINED

[75] Inventor: Patrick Jacquemart, Calais, France

[73] Assignee: Sociéte Anonyme dite: les Cables de Lyon, Lyon, France

[21] Appl. No.: 12,694

[22] Filed: Feb. 16, 1979

[30] Foreign Application Priority Data

Mar. 14, 1978 [FR] France ................................. 78 07275

[51] Int. Cl.² .......................... B29D 23/02; B29F 1/10
[52] U.S. Cl. ..................................... 264/275; 425/13; 425/129 R
[58] Field of Search ...................... 249/90; 425/11, 12, 425/13, 14, 127, 129; 264/275

[56] References Cited

U.S. PATENT DOCUMENTS

| 2,851,061 | 9/1958 | Bernard et al. | 425/13 X |
| 3,783,057 | 1/1974 | McNerney | 249/90 X |
| 3,964,845 | 6/1976 | Duggan et al. | 425/129 R X |
| 4,145,176 | 3/1979 | Nelson | 425/129 R X |

FOREIGN PATENT DOCUMENTS

| 921902 | 3/1963 | United Kingdom | 249/90 |
| 1046218 | 10/1966 | United Kingdom | 425/13 |
| 1423035 | 1/1976 | United Kingdom | 425/13 |

Primary Examiner—J. Howard Flint, Jr.
Attorney, Agent, or Firm—Sughrue, Rothwell, Mion, Zinn and Macpeak

[57] ABSTRACT

The device includes a moving mould 2 which defines a cylindrical mould cavity 12 closed on one side and open on the other. The repair material 10 is brought through an annular orifice, the pressure of the material drives the slidable mould towards the right (closed side) and the hardening material completes the closing of the mould which, while moving, can cover any distance and the length of the packing to be effected is therefore not limited, while the volume of the tooling is small. A fixed sleeve 3 is used to prime the operation.

4 Claims, 3 Drawing Figures

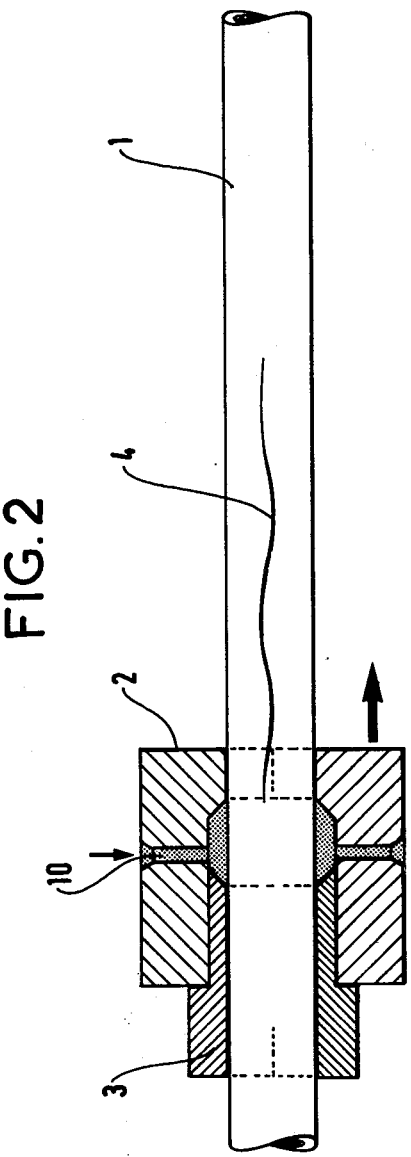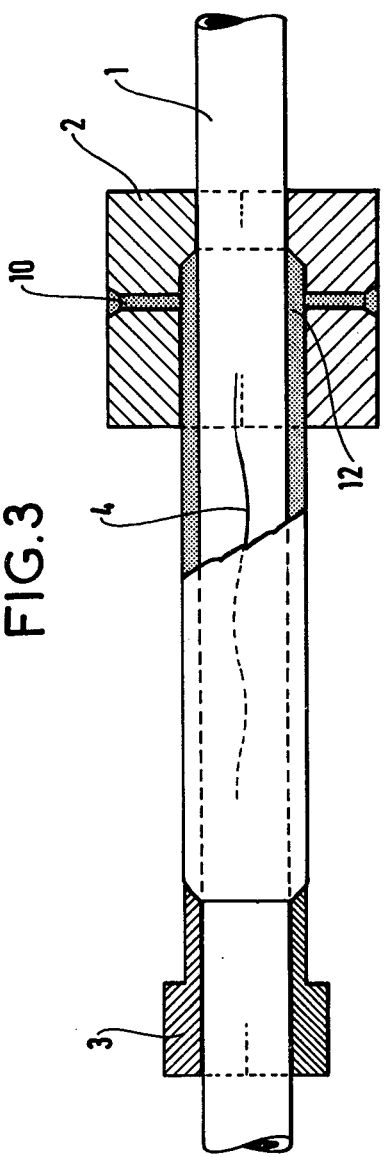

METHOD AND A DEVICE FOR REPAIRING INSULATED CABLE WHICH HAS BEEN DAMAGED OR JOINED

FIELD OF THE INVENTION

The invention relates to a method and to a device for covering, thickening or repairing an insulated cable which has been damaged or joined. The operation is performed by displacement of a moving mould, and it can be used on inner layers of insulation of a cable as well as on an outer sheath.

BACKGROUND OF THE INVENTION

Electric cables are generally constituted by a central conductor surrounded by one or several layers of insulation on which various protections or other conductors are applied, the whole being covered by an outer protective sheath.

These types of cables are repaired or connected together in four operations:
  Connecting the central conductor(s);
  Moulding the insulations;
  Reconstituting the protective means; and
  Reconstituting the sheath.

The invention relates to a method of performing operations two and four, namely moulding the insulation and reconstituting the sheath.

The following methods of reconstituting the insulation or the sheath are known in the prior art. In a first method, material is added in the form of wrapped tapes or of half shells, then a heated mould is placed thereover and after gelling or vulcanization, the mould is cooled. Another method consists in placing a mould at the required place and the material is injected in a single or multiple operation. If necessary the material is heated, and in all cases, it is cooled. Such repairs generally give satisfactory results; however, the length of these repairs is limited by the length of the available moulds. If the mixture has to be reconstituted over a length greater than that of the longest available mould, several successive moulding operations must be carried out. This leads to lengthy repair cycles with numerous handling operations, while long moulds must be available if too great a number of cycles is to be avoided.

The tolerances of the various parameters of the cycle are extremely narrow, since, for example, the welding of the injected plastics material with that of the cable must not cause excessive swelling or shrinking of the latter.

Several moulding requirements are in oppostion to each other when the moulding are varied and this leads to the acceptance of compromises of a rather fragile nature.

In simple or multiple injections, the motion of the material causes some imperfections in moulding which are difficult or even impossible to overcome, (e.g. de-centering the conductor).

British Pat. No. 921 902 proposes repairing the insulation or the outer protective sheath of an electric cable by using a moving mould which includes a cavity that is supplied with molten thermoplastic material, and whose displacement is obtained either by a mechanical drive or simply by the thrust exerted by the molten thermoplastic material on the intact part of the cable insulation or sheath. This method cannot be used to repair a faulty insulation or sheath when the part to be repaired and the adjacent undamaged parts are of substantially uniform diameter.

The aim of the present invention is to provide a method and a device for covering, thickening or repairing an insulated cable which has been damaged or joined, which method and device are capable of being used on a length of cable of substantially uniform diameter and including a damaged or jointed portion.

SUMMARY OF THE INVENTION

The present invention provides a method of covering, thickening or repairing an insulated, damaged electric cable or cable connection, by reconstituting the insulation or the sheath of the cable by means of a moving mould placed around the cable, wherein the said moving mould is in two main parts: a moving part and a stationary part both of which substantially surround a cable. The moving part is slidably installed on the cable and defines a mould cavity which is open at one end towards the stationary part of the mould, which closes the mould cavity when the moving part is placed in a starting position for a moulding operation; and wherein molten thermoplastic material is injected into the mould cavity at a pressure sufficient to move the moving part away from the stationary part over a period of time which is sufficient for the moving part to move over the distance required for the covering, thickening or repairing of the cable.

This produces a kind of extrusion machine where the machine moves leaving behind it stationary extruded insulation or sheath.

Preferably the material is injected into the mould simultaneously round the whole periphery of the mould.

In this way there is little or no tendency for the inner conductor to be displaced radially (in the case of moulding of the insulation); or for the core to be displaced radially (in the case of moulding of the sheath), so the plastics material can be injected at high pressure. This particularly widens the cycle tolerances and reliability.

The present invention also provides a device for performing the method, the device comprising two main parts, both of substantially cylindrical symmetry: a stationary part which includes means for fastening it to the cable and including a sleeve which surrounds the cable, the cross-section of the sleeve defining the cross-section of the material which is to be deposited on the cable; and a moving part which is slidably mounted on the cable and includes a cylindrical mould cavity equipped to be threaded by the cable to be repaired and having a cross-section equal to that of the sleeve of the stationary part; the mould cavity being open towards the stationary part so that the sleeve of said stationary part can be engaged in the mould cavity to close it, the moving part including at least one filling orifice at its end opposite to the stationary part, and means for introducing molten thermoplastic material through the orifice into the mould cavity.

Preferably the moving part of the mould forms a cylindrical cavity of greater length than the mould cavity when closed by the sleeve of the stationary part, the mould cavity being extended towards its open end as the moving part moves away from the stationary part; the cylindrical wall of the cavity including heating means disposed near its closed end and cooling means disposed near its open end.

It is thus possible to reconstitute insulation or plastics sheaths over an unlimited length in a single injection. The stationary part is used for starting the operation.

The following description, given by way of a nonlimiting example with reference to the accompanying drawings explains how the invention can be put into practice.

BRIEF DESCRIPTION OF THE DRAWINGS

FIG. 2 illustrates schematically the device at the beginning of a packing operation; and FIG. 3 illustrates schematically the device at a subsequent time during operation.

DESCRIPTION OF PREFERRED EMBODIMENTS

Figure 1:
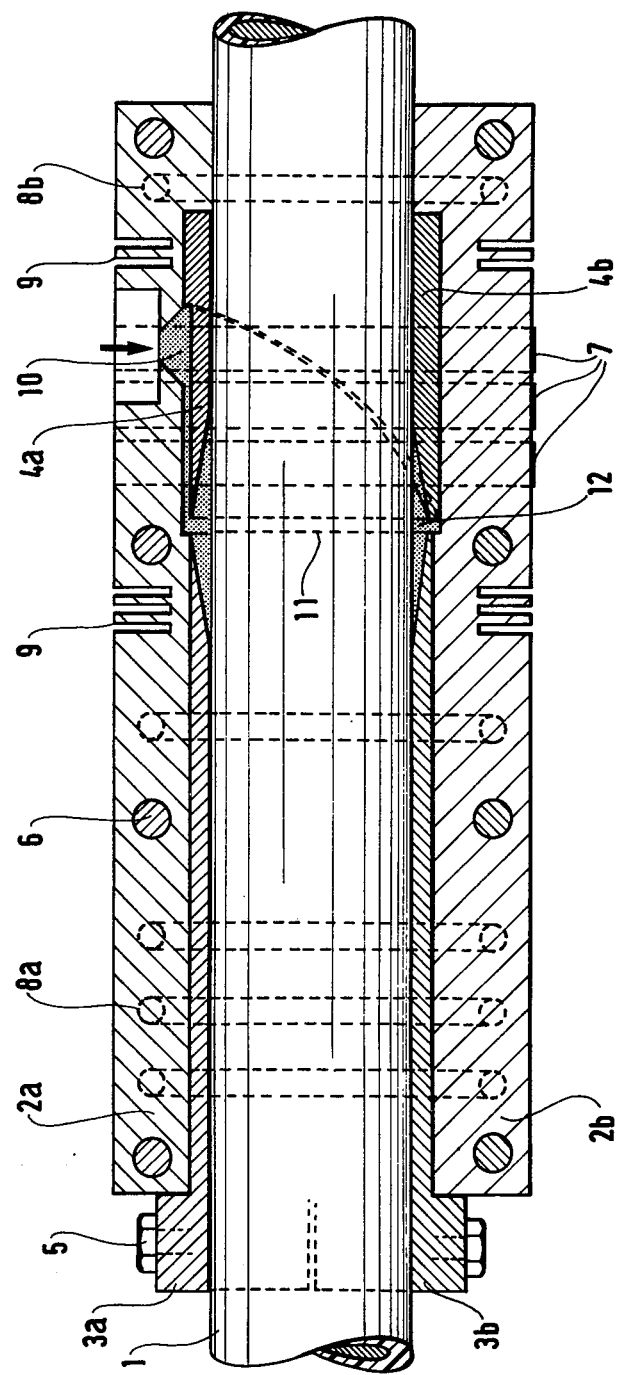
FIG. 1 illustrates an axial cross-section of a device in accordance with the invention.

A device is placed on a cable 1 whose insulation is cracked at 4 (FIG. 2) for example, said device including a stationary part 3 which comprises, for example, two half-shells 3a and 3b clamped and fixed on the cable by screws 5 and a moving part constituted by a mould 2 which is constituted by two half-moulds 2a and 2b assembled by clamping screws 6. The mould includes two half-journals 4a and 4b to define the mould cavity.

The device is used as follows:

When the two half-journals 4a and 4b have been positioned and the two guiding half-shells 3a and 3b have been fastened to the cable 1 by means of the screws 5, the two half-moulds 2a and 2b are assembled by the clamping screws 6.

The mould includes heating resistors 7, cooling circuits 8a and 8b and heat barriers 9 which control the distribution of the temperature.

Thermoplastic material 10 is injected under pressure through an annular passage 11 and in a first phase fills the empty parts 12 of the mould.

In a second phase, the injections assembly and the mould move under the effect of the resultant of the pressure against the cable which is held still, thereby reconstituting the insulation or the sheath of the cable, as illustrated in FIGS. 2 and 3, in which the positions of the cable 1, of the mould 2 and of the guiding cable clamp 3 are schematically illustrated at the beginning and end of a repair operation on the sheath.

For example, sheath damage 4 very schematically shown in FIG. 2 cannot be repaired by welding with a pistol-grip iron and a length of thermoplastic fillet, nor, due to its length, can it be repaired by a conventional moulding method.

Another conventional method consists of sliding a pre-moulded cylinder made of a thermoplastic material of the same kind along the whole cable so as to mask the damage and to finish sealing by two mouldings which weld the cylinder to the intact sheath of the cable on either side of the defect. However, the method requires the adjacent cable to be shifted completely and necessitates two mouldings and can be envisaged only if the length of the damage is compatible with that of available pre-moulded cylinders.

In the present invention, the mould 2 and the guide 3 are installed as described hereinabove, for example to the left of the damage (see FIG. 2), and then thermoplastic material is injected and the temperature of the injected fluid and of the mould, as well as the pressure, are maintained at a level suitable for proper welding on the sheath to the left of the damage (after an initial stabilization stage). Then the mould is allowed to move to the right under the effect of the resultant pressure; if required, movement can be assisted and constant speed can be maintained by assisting the movement with servo-mechanisms. Since the guide 3 remains in place, there comes a time when the initially injected plastics material which appears to the left of the mould guides the latter instead of, and in place of, the guide 3 which performed that function at the beginning of the movement. The speed is therefore selected so that the injected thermoplastic material has the time to solidify when passing in front of the cool zone of the mould through the passages 8 in order to be able to perform the guide function.

Providing the above condition is fulfilled, the length of the repair is limited only by that of installation form moving the mould and the press or by the injectable volume of the injection press. In one typical application of the invention, the use of a groove-feed extrusion machine is preferable to provide high injection pressure and unlimited injection volume.

In a third repair phase, (FIG. 3), the movement of the mould is stopped and the temperature of the material and of the mould, as well as the pressure weld the injected plastic solidly to the sheath of the cable, to the right of the damage, while the cooling of the mould by the circuits 8a and 8b is compatible with the requirements of the expansion of the insulation.

Due to the dispostion of the embodiment shown since the sleeve is constituted by two half-journals 4a and 4b, unmoulding does not pose any particular problem.

I claim:

1. A method of covering, thickening or repairing an insulated, damaged electric cable or cable connection, by reconstituting the insulation or the sheath of the cable, said method comprising placing a moving mould around the cable with said moving mould comprising two main parts: a moving part and a stationary part both of which substantially surround a cable such that said moving part is slidably installed on the cable and defines a mould cavity which is open at one end facing towards the stationary part of the mould and closing the mould cavity by the moving part placed in a starting position for a moulding operation; and injecting molten thermoplastic material into the mould cavity at a pressure sufficient to move the moving part away from the stationary part over a period of time which is sufficient for the moving part to move over the distance required for the covering, thickening or repairing of the cable.

2. A method according to claim 1, wherein the material is injected into the mould simultaneously around the whole periphery of the mould.

3. A device for covering, thickening or repairing an insulated, damaged electric cable or cable connection by reconstituting the insulation or the sheath of the cable by moulding said insulation or sheath locally in situ, said device comprising two main parts, both of substantially cylindrical symmetry: a stationary part including means for fastening it to the cable and including a sleeve which surrounds the cable, the cross-section of the sleeve defining the cross-section of the material which is to be deposited on the cable; and a moving part which is slidably mounted on the cable to the side of said stationary part and which includes a cylindrical mould cavity equipped to be threaded by the cable to be repaired and having a cross-section equal to that of the sleeve of the stationary part; said mould cavity being open facing towards the stationary part so that the sleeve of said stationary part is engaged in the mould cavity to close it, the moving part including at least one filling orifice at its end opposite to the stationary part, and means for introducing molten thermoplastic material through the orifice into the mould cavity to fill said cavity and force said moving part axially away from said stationary part.

4. A device according to claim 3, wherein the moving part of the mould forms a cylindrical cavity of greater length than the mould cavity when closed by the sleeves of the stationary part, the mould cavity being extended towards its open end as the moving part moves away from the stationary part; the cylindrical wall of the cavity including heating means disposed near its closed end and cooling means disposed near its open end.

* * * * *